United States Patent [19]

Wilson et al.

[11] 4,077,055
[45] Feb. 28, 1978

[54] GROUND FAULT PROTECTIVE DEVICE

[75] Inventors: John T. Wilson; James P. Ellsworth, both of Beaver, Pa.

[73] Assignee: Westinghouse Electric Corporation, Pittsburgh, Pa.

[21] Appl. No.: 696,325

[22] Filed: Jun. 15, 1976

[51] Int. Cl.² ............................................... H02H 3/28
[52] U.S. Cl. ........................................ 361/46; 361/115
[58] Field of Search .............. 317/18 D, 33 SC, 18 R, 317/36 TD, 58; 335/18, 160, 172; 361/42, 44, 45, 46, 98, 100, 101, 102, 115

[56] References Cited
U.S. PATENT DOCUMENTS

| 3,440,580 | 4/1969 | Molenaar | 317/18 D |
| 3,826,951 | 7/1974 | Mater et al. | 317/33 SC |
| 3,899,717 | 8/1975 | Legatti et al. | 317/18 D |

Primary Examiner—J D Miller
Assistant Examiner—Patrick R. Salce
Attorney, Agent, or Firm—Robert E. Converse, Jr.

[57] ABSTRACT

A self-powered self-contained ground fault protective device including a current monitor, an electronic circuit for amplifying the output of the current monitor, a relay connected to the amplifying circuit and adapted to operate whenever ground fault current through the current monitor rises above a predetermined level, and an interchangeable rating plug including means for activating a circuit board switch. The current monitor, amplifying circuit, and relay are all supported and enclosed by a molded insulating housing. The rating plug is inserted into a socket on the exterior of the housing.

7 Claims, 6 Drawing Figures

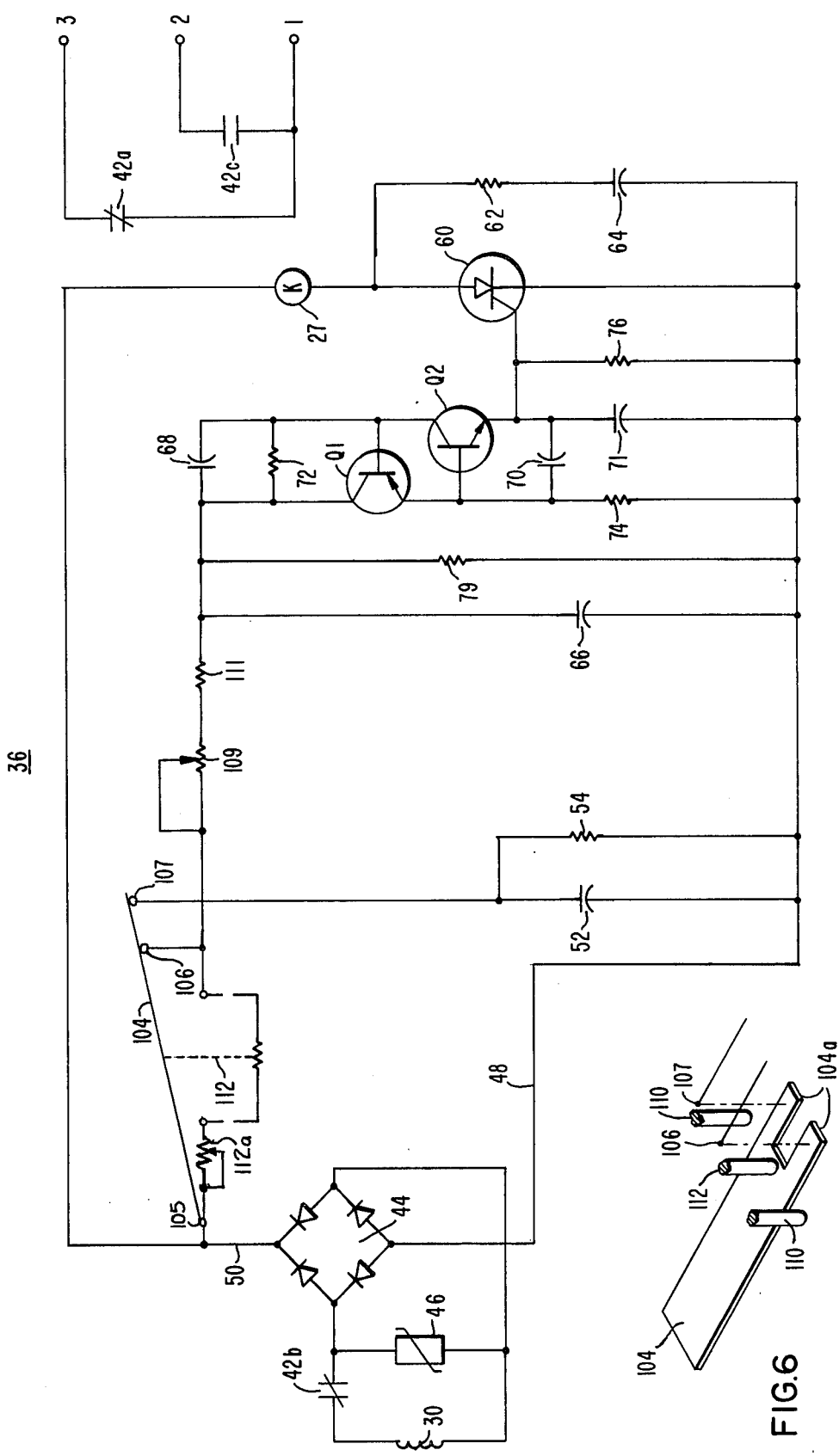

GROUND FAULT PROTECTIVE DEVICE

CROSS REFERENCE TO RELATED APPLICATIONS

The invention disclosed in the present application is related to U.S. Patent Application Ser. No. 696,326 "Ground Fault Protection Device" filed June 15, 1976 by John T. Wilson and assigned to the assignee of the present application.

BACKGROUND OF THE INVENTION

1. Field of the Invention

The invention relates to electrical apparatus, and more particularly, to apparatus for protecting electrical circuits from damage due to ground faults.

2. Description of the Prior Art

In designing circuits for the transmission and distribution of electrical power, it is customary to provide means for protecting the conductors and electrical apparatus being powered from the conductors from overcurrent conditions. It has gradually been recognized that devices employed for overcurrent protection are not sufficient to prevent damage resulting from ground faults; that is, a short circuit between one or more of the electrical conductors and objects connected directly or indirectly to ground. The amount of current which flows through a ground fault may be below the level required to operate the overcurrent protective devices. However, this ground fault current can result in high transient overvoltages throughout the system, high temperatures due to arcing conditions leading to fire, or both.

Various methods of detecting and correcting ground faults have been used in the past. A current transformer is positioned to surround the conductors of the circuit being protected. This transformer, also referred to as a current monitor, produces an output signal upon occurrence of a ground fault condition at a point downstream from the current monitor on the circuit being protected. The monitor is connected to a separate device known as a sensor which includes a switching device such as a relay actuated by the output from the current monitor when a ground fault occurs. The contacts of the relay are then used to interrupt the supply of electrical power to the circuit being protected. A device disclosed in copending U.S. Patent Application Ser. No. 696,326, filed June 15, 1976, by John T. Wilson performs the same function and is self-powered and self-contained in a unitary molded insulating housing. It would be desirable to provide a self-powered self-contained ground fault device which is suitable for use at a variety of ground fault trip current levels.

SUMMARY OF THE INVENTION

In accordance with the principles of the present invention there is provided a self-contained self-powered ground fault protective device having an interchangeable rating plug. The device includes a current monitor, means for actuating associated circuit interrupter devices, switching means connected to the output of the current monitor for triggering the actuating means, and a main housing of molded insulating material supporting and completely enclosing the current monitor, triggering means, and switching means. The main housing includes an aperture, or window, through which the conductors of the circuit being protected are passed and a socket adapted to receive an interchangeable rating plug. When ground fault current above a predetermined level flows through this circuit, the current monitor will produce an output to the triggering means which in turn energizes the switching means and actuates a set of contacts. These contact outputs can be used to control a circuit breaker or other circuit interrupting device to disconnect the source of electrical power to the circuit being protected.

The interchangeable rating plug includes a resistor mounted in an insulating plug housing and connected to male connectors adapted to be inserted into corresponding female connectors in the main housing socket. The rating plug also includes a member adapted to actuate a switch in the triggering means to change the level of grounnd fault current at which the device will trip. A variety of rating plugs, each identical except for the value of the resistor, can be used with a single ground fault protective device to provide for tripping at a variety of ground fault current levels.

The ground fault protective device is powered entirely by the ground fault current flowing through the circuit being protected and requires no physical connection other than to an associated circuit interrupter for deenergizing the circuit being protected. Since the device is entirely self-powered and self-contained, cost and installation requirements are minimized. The use of a variety of interchangeable rating plugs allows a single device to be used to trip at a variety of ground fault current levels.

BRIEF DESCRIPTION OF THE DRAWINGS

The novel and distinctive features of the invention are set forth with particularity in the appended claims. The invention, together with further objects and advantages thereof, may be best understood, however, by reference to the following description and accompanying drawings, in the several figures of which like reference characters identify like elements, and in which:

FIG. 3 is a schematic drawing of the electrical circuitry of the device shown in FIGS. 1 and 2;

FIG. 6 is a perspective view of a resilient switch arm having bifurcated ends.

DESCRIPTION OF THE PREFERRED EMBODIMENT

Figure 1:
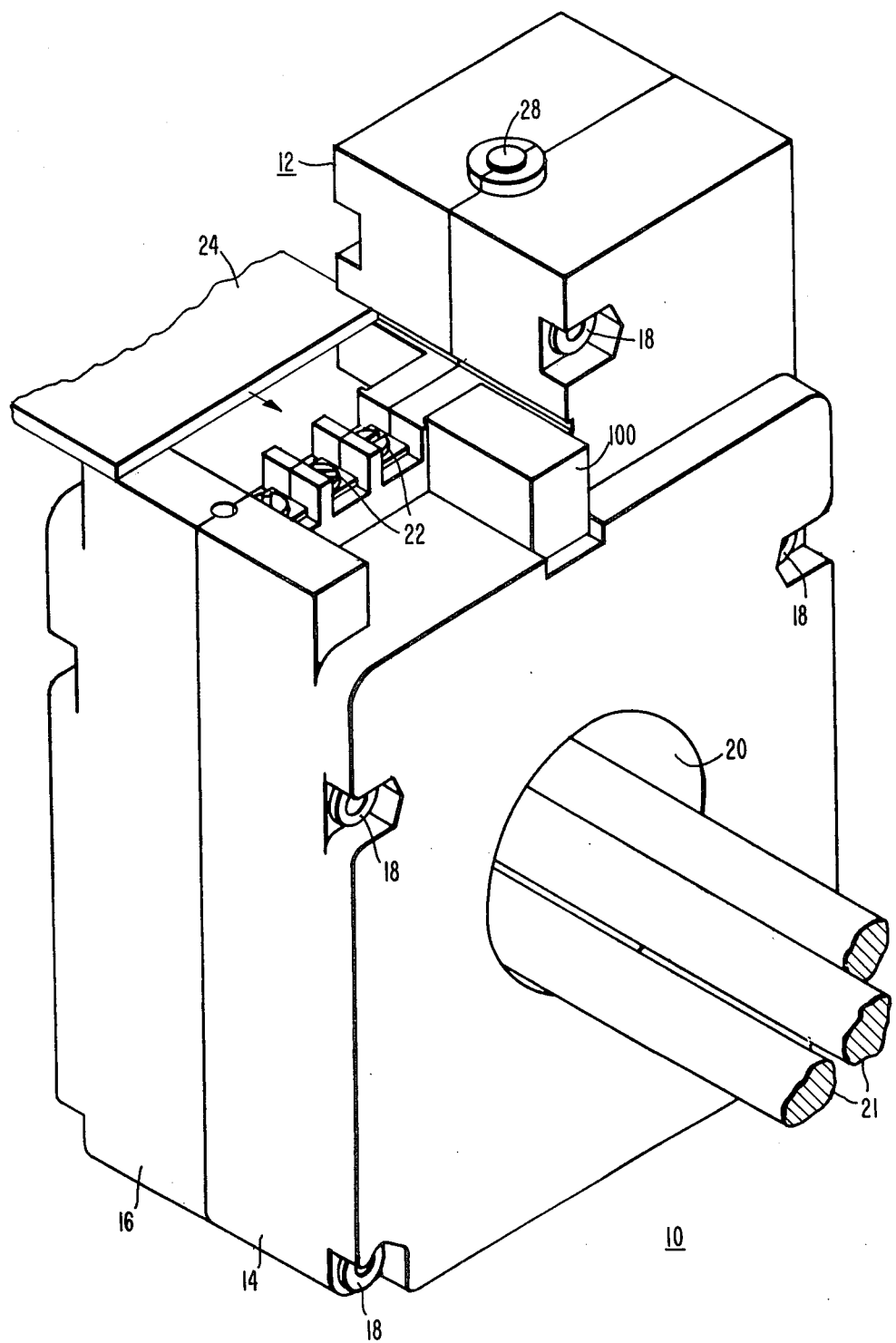
FIG. 1 is a perspective view of a ground fault protective device incorporating the principles of the present invention.

In FIG. 1 there is shown a perspective view of a ground fault protective device 10 incorporating the principles of the present invention. The device 10 includes a molded insulating housing 12 comprising a front shell 14 and a rear shell 16 joined by fastening devices such as rivets 18. The housing 12 includes an aperture or window 20 through which the conductors 21 of the electrical circuit being protected are passed. Three terminals 22 are mounted upon the top side of the housing 12 and are protected by a removable cover 24. The terminals 22 are connected to contacts of a bistable switching device such as latching relay 26 shown more clearly in FIG. 2. Also extending through the top of the housing 12 is a reset indicator button 28 mechanically connected to the latching relay 26. To the right of the terminals 22 as seen in FIG. 1, a rating plug 100 is inserted into a socket in the front shell 14.

Figure 2:
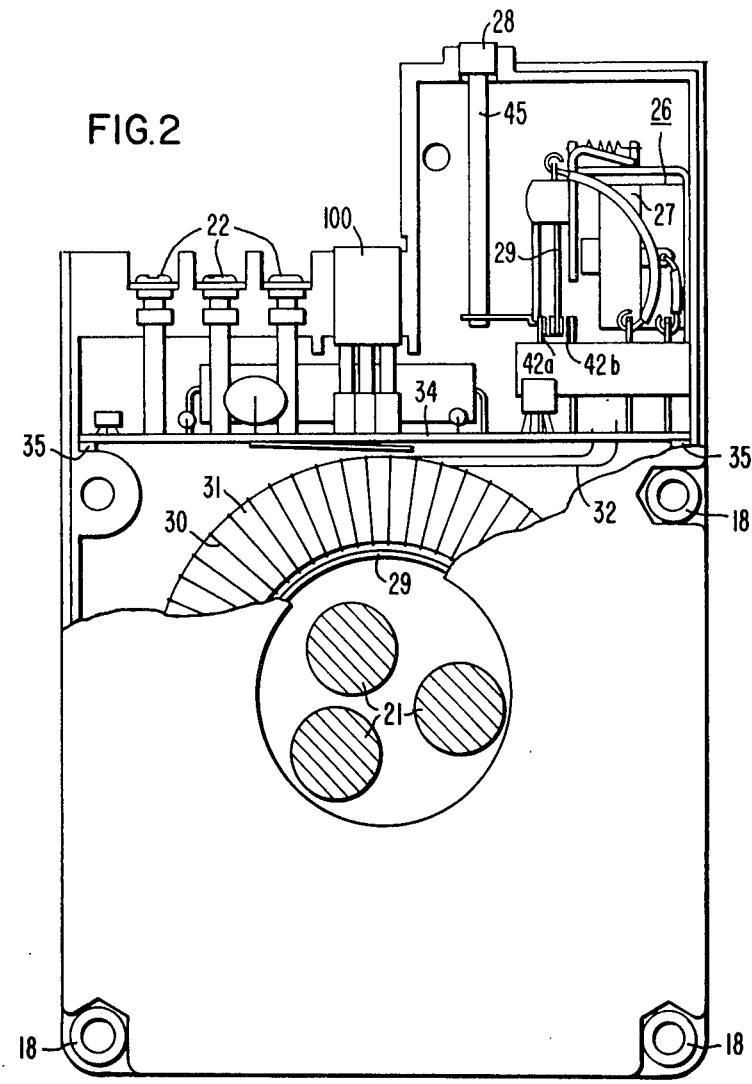
FIG. 2 is a front elevational view with parts partially cut away of the device shown in FIG. 1.

Referring now to FIG. 2 it can be seen that the aperture 20 is formed by collars 29 molded into the front and rear housing portions 14 and 16. Surrounding the collars 29 is a coil 30 wound upon an insulated core 31 composed of windings of iron tape. The coil 30 functions as the secondary of a current transformer, thereby forming a current monitor. Leads 32 are connected to the coil 30 and to an electronic circuit board 34 supported upon spars 35 cemented to the housing 14. Mounted upon the circuit board 34 is the latching relay 26 and an electronic triggering and switching circuit 36, shown schematically in FIG. 3. The relay 26 includes a coil 27, an armature 29, and contacts 42a, 42b, and 42c across the input of a full wave rectifier bridge 44. Also connected across the input to the bridge 44 is a metal oxide varistor 46. The metl oxide varistor 46 protects the rest of the circuit 36 against transients generated in the coil 30. The output of the bridge 44 is connected to a common lead 48 and a supply lead 50. An interchangeable resistor 102 mounted in the plug 100 is removably inserted in the circuit 36 to determine the level of ground fault current in the circuit 21 which will result in the device 10 being actuated. A switch arm 104 cooperates with points 106 and 107, in a manner to be more fully explained, when no rating plug is inserted. A filter comprising capacitor 52 and resistor 54 is connected across the supply and common leads 50 and 48. Transistors Q1 and Q2 are connected as a silicon controlled rectifier across the leads 50 and 48 to trigger the input of a switching device such as the thyristor 60. The thyristor 60 functions to switch power flowing from the supply lead 50 through the relay coil 27 and common lead 48. A snubbing circuit comprising resistor 62 and capacitor 64 acts to slow the voltage rise across the thyristor 60 to prevent undesired transients from activating the thyristor 60. Transient protection and noise immunity is also provided by capacitors 66, 68, and 70 and resistor 72. Capacitor 66 also stores energy to be dumped into the input of the thyristor 60 during a tripping operation. Resistors 74 and 76 serve to maintain the inputs of thyristor 60 and transistors Q1, Q2, respectively at ground level at times other than during a ground fault.

In operation, a ground fault current through the conductors of the circuit 21 surrounded by the coil 30 will produce an output signal from the coil 30 which is rectified and filtered by the bridge 44, capacitor C1, and resistor 54. The signal causes transistors Q1 and Q2 to trigger thyristor 60, causing it to conduct. Current thus flows through the relay coil 27, thereby moving the armature 29 and actuating the contacts 42a, 42b, 42c. Contacts 42a and 42b (normally closed) are opened, and contact 42c (normally open) is closed. When the contact 42b is opened, the power supply for circuit 36 is disconnected. However, the relay 26 is a latching relay and the contacts 42a, 42b, and 42c remain in the condition brought about by its actuation. An associated shunt trip circuit connected across the contacts 42c will be activated, causing the associated circuit breaker to open and take appropriate action to deenergize the conductors of the circuit 21 passing through the coil 30. Actuation of the relay 26 causes the connecting rod 45 to move upward as seen in FIGS. 1 and 2, thereby extending the reset indicating button 28 above the level of the housing 12. This provides a positive indication that a ground fault has occurred on the circuit being protected. The relay 26 will remain in this position until the reset indicating button 28 is manually depressed. This moves the armature 29 and resets the position of the contacts 42a, 42b, and 42c to the condition shown in FIG. 3.

Figure 4:
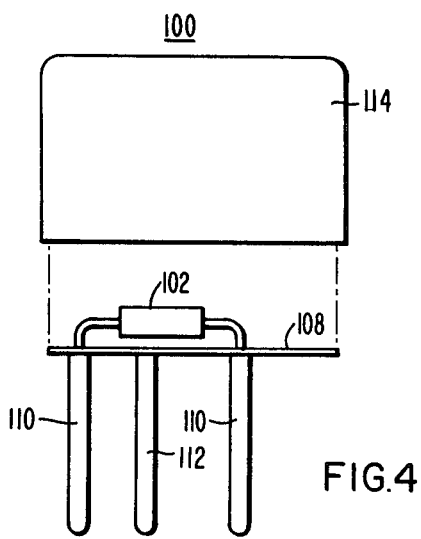
FIG. 4 is a front elevational view of the interchangeable rating plug shown in FIGS. 1 and 2.
Figure 5:
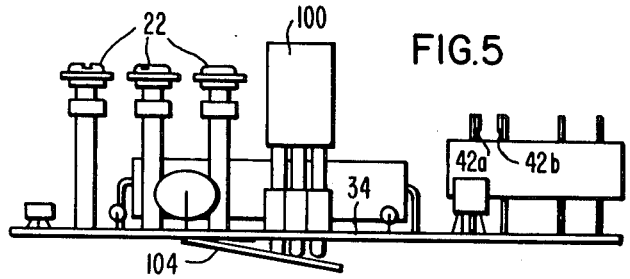
FIG. 5 is a side view of the circuit board shown in FIG. 2.

As can be seen more clearly in FIG. 4, the resistor 102 is mounted upon an insulating base 108 of the rating plug 100 and is electrically connected to two connecting pins 110. Also connected to the base 108 is a switch member, or pin, 112. An insulating cap 114 is cemented to the base 108 to enclose the resistor 102.

Referring to FIGS. 3, 4, 5, and 6, it can be seen that the circuit board 34 includes a switch arm 104 having bifurcated ends 104a and being constructed of resilient material such as spring steel. The switch arm 104 is secured at one end to the circuit board 34 and is mechanically biased upward toward the circuit board 34 so that its bifurcated ends normally rest upon points 106 and 107 attached to the circuit board 34. In this position the switch arm electrically connects the points 105, 106 and 107 as seen in FIG. 3. Thus the resistance of a potentiometer 109 and a resistor 111 determine the level of ground fault current which will result in a tripping operation of the device 10. In this condition the device 10 is most sensitive and will trip on a small amount of ground fault current; for example, 5 amperes. The filter composed of capacitor 52 and resistor 54 is connected in the circuit to provide energy storage for more positive tripping action at low ground fault current levels. By using a small, low-voltage capacitor 52 for low ratings and switching the capacitor out of the circuit for higher ratings at which higher voltages are generated, the circuit 36 can be made more compact. Providing a bifurcated switch arm 104 insures positive contact with the points 106 and 107.

Insertion of a rating plug 100 in the device 10 causes a resistor 102 to be electrically inserted in series with potentiometer 109 and resistor 111 through the pins 110. In addition, the pin 112 contacts the switch arm 104, causing it to move away from the contacts 106 and 107. Insertion of the additional resistance of the resistor 102 in the circuit 36 reduces the sensitivity thereof. That is, a higher level of ground fault current flow through the circuit 21 is required before the device 10 will actuate. By inserting a variety of rating plugs having resistors 102 of larger and larger value, the ground fault current trip level can be increased to any desired value. For higher trip current levels, filter 52, 54 is no longer needed, and is disconnected by inserting the rating plug.

By combining the current monitor, electronic circuitry, and relay in a single unitary housing, the invention eliminates the necessity to position and mount two or more devices as was necessary using separate current monitors and sensors. This also eliminates the necessity of a connection between the current monitor and sensor, thereby reducing installation costs and avoiding any possible spurious responses due to noise pickup on the connecting leads. Providing a variety of interchangeable removable rating plugs allows a single device to be used to provide protection on circuits requiring a variety of ground fault current trip levels. Since the described device is self-powered, it eliminates the necessity to route, install, and connect power leads for the sensor. It can be seen therefore that the present invention provides a ground fault protective device which is lower in cost, simpler to install, and more versatile, while providing improved performance over the prior art.

We claim:

1. Apparatus for protecting power distribution circuits from ground fault damage, comprising:
   a current monitor providing an output signal in response to ground fault current flow in a circuit being protected;
   electrical switching means for controlling an associated circuit interrupter;
   electronic circuit means connected to said current monitor and said electrical switching means for actuating said switching means upon receipt of an output signal from said current monitor, said circuit means comprising a mechanical switch for altering parameters of said circuit; and
   an interchangeable rating plug removably connected to said electronic circuit means, said plug determining the level of ground fault current required to actuate said switching means and comprising a resistor, means for electrically connecting said resistor to said electronic circuit means, and means for mechanically actuating said switch when said rating plug is connected to said electronic circuit means, whereby parameters of said electronic circuit are adjusted.

2. Apparatus as recited in claim 1 wherein said rating plug comprises a base and a plug housing attached to said base and enclosing said resistor, said connecting means comprises a pair of connecting pins, said electronic circuit means comprises a socket adapted to receive said connecting pins, and said switch comprises a resilient switch arm and a contact, said switch arm being biased against said contact, and said rating plug actuating means comprises a pin adapted to bear against said resilient arm when said rating plug is inserted into said socket means and separate said resilient arm from said contact.

3. Apparatus as recited in claim 2 wherein said switch means bifurcated ends adapted to individually engage said contact.

4. A self-powered ground fault protective device, comprising:
   a current monitor providing an output signal in response to ground fault current through a circuit being protected;
   electrical switching means for controlling an associated circuit interrupter;
   electronic circuit means connected between said current monitor and said switching means for energizing said switching means upon receipt of an output signal from said current monitor, said circuit means comprising a mechanical switch operable when actuated to adjust parameters of said circuit;
   a molded insulating housing supporting and enclosing said current monitor, said switching means, and said electronic circuit means; and
   an interchangeable rating plug removably connected to said electronic circuit means, said plug determining the level of ground fault current required to actuate said switching means and comprising a resistor, means for electrically connecting said resistor to said electronic circuit means, and means for actuating said mechanical switch when said rating plug is connected to said electronic circuit means.

5. A self-powered protective device as recited in claim 4 wherein said rating plug comprises a base and a plug housing attached to said base and enclosing said resistor, said connecting means comprises a pair of connecting pins, said electronic circuit means comprises a socket adapted to receive said connecting pins, and said mechanical switching means comprises a resilient switch arm and a contact, said switch arm being biased against said contact, and said rating plug actuating means comprises a pin adapted to bear against said resilient arm to disconnect said resilient arm and said contact when said rating plug is inserted into said socket means.

6. A self-powered ground fault protective device as recited in claim 5 wherein said switch arm comprises bifurcated ends.

7. A self-powered ground fault protective device comprising:
   a current transformer secondary coil;
   electronic circuit means connected to said coil for amplifying the output of said coil and comprising rectifier means and a mechanical switch operable when actuated to adjust parameters of said circuit, said switch comprising a pair of contacts and a resilient switch arm comprising bifurcated ends adapted to engage said contacts;
   a latching relay connected to said electronic circuit means and comprising output terminals adapted to control an associated interrupting device;
   a housing supporting and enclosing said coil, said electronic circuit means, and said relay; and
   an interchangeable rating plug removably inserted into said housing and comprising a resistor, a pair of connecting pins for connecting said resistor into said electronic circuit means, a cover mounted upon said base and enclosing said resistor, and a pin adapted to bear against said resilient switch arm when said rating plug is inserted into said housing.

* * * * *